United States Patent
Yates et al.

(10) Patent No.: US 11,182,863 B1
(45) Date of Patent: Nov. 23, 2021

(54) JOINT MODELING OF USER AND CONTENT FEATURE VECTOR DATA BASED ON THIRD PARTY SOURCE DATA

(71) Applicant: Facebook, Inc., Menlo Park, CA (US)

(72) Inventors: Andrew Donald Yates, San Francisco, CA (US); Kurt Dodge Runke, Los Altos, CA (US); Gunjit Singh, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 230 days.

(21) Appl. No.: 16/362,222

(22) Filed: Mar. 22, 2019

Related U.S. Application Data

(63) Continuation of application No. 15/365,899, filed on Nov. 30, 2016, now Pat. No. 10,282,792.

(51) Int. Cl.
  *G06F 16/9535* (2019.01)
  *G06Q 50/00* (2012.01)
(52) U.S. Cl.
  CPC ......... *G06Q 50/01* (2013.01); *G06F 16/9535* (2019.01)
(58) Field of Classification Search
  None
  See application file for complete search history.

(56) References Cited

U.S. PATENT DOCUMENTS

| | | | |
|---|---|---|---|
| 9,348,924 B2 * | 5/2016 | Somekh | G06F 16/9535 |
| 2007/0073723 A1 | 3/2007 | Ramer et al. | |
| 2008/0249832 A1 | 10/2008 | Richardson et al. | |
| 2010/0023475 A1 | 1/2010 | Lahav | |
| 2014/0156411 A1 | 6/2014 | Murgai | |
| 2015/0066630 A1 | 3/2015 | Ge et al. | |
| 2015/0339704 A1 | 11/2015 | Liu et al. | |
| 2016/0180375 A1 | 6/2016 | Rose et al. | |
| 2016/0292746 A1 | 10/2016 | Kang et al. | |

\* cited by examiner

*Primary Examiner* — Belix M Ortiz Ditren
(74) *Attorney, Agent, or Firm* — Fenwick & West LLP

(57) ABSTRACT

An online system generates content feature entries, with each content feature entry describing a content item from a third party system. The online system generates user feature entries, each user feature entry describing a user. The online system generates a combination score for a target user and a selected content item by computing a combination of the content feature entries associated with the selected content item and the user feature entries associated with the target user using a combining function. The combination score indicates an estimated increase in value for the third party system when the target user is presented with the selected content item. The online system selects content items to transmit to a client device of a target user of the online system for presentation to the target user based on the combination score for the content items and the target user.

15 Claims, 4 Drawing Sheets

JOINT MODELING OF USER AND CONTENT FEATURE VECTOR DATA BASED ON THIRD PARTY SOURCE DATA

CROSS REFERENCE TO RELATED APPLICATIONS

This application is a continuation of co-pending U.S. application Ser. No. 15/365,899, filed Nov. 30, 2016, which is incorporated by reference in its entirety.

BACKGROUND

This disclosure relates generally to online systems, and in particular to joint modeling of user and content scores based on third party data.

Certain online systems, such as social networking systems, allow their users to connect to and to communicate with other online system users. Users may create profiles on such an online system that are tied to their identities and include information about the users, such as interests and demographic information. The users may be individuals or entities such as corporations or charities. Because of the increasing popularity of these types of online systems and the increasing amount of user-specific information maintained by such online systems, an online system provides an ideal forum for third parties to present content to online system users.

In some cases, after a target user is presented with content by the online system from a third party system, the target user may subsequently perform various actions with the third party system that may not be known to the online system or detectable to the online system. With the information regarding the actions and other activities performed by the target user at a third party system, the third party system may have a large database of information regarding the logged actions and other characteristics of the target user. This additional data from a large number of users may provide the ability to better determine which users respond best to which type of content that is presented to those users. However, the online system does not have access to this data to use in selection of third party content to provide to user, nor a reasonable way to use this in ranking of content for users.

SUMMARY

Embodiments include an online system that generates a score for a content item and a target user based on a content feature vector including data received from a third party system and a user feature vector including information about the target user.

The online system may receive third party source data from a third party system. The third party source data includes information regarding users and content items from the third party. This third party source data may include information such as user interaction with certain content items, tags for the users and content items, identification of users and content items, and so on.

The online system generates content feature vector entries based on the third party source data. Each of these content feature vector entries describes a corresponding content item from the third party, with each component in each content feature vector related to a characteristic of the corresponding content item. These components may be any component items that are provided by the third party system in the third party source data.

The online system also generates user feature vector entries based on the third party source data. Similar to the feature vector entries, each user feature vector entry describes a corresponding user of the third party system, with each component in each user feature vector related to a characteristic of the corresponding user.

The online system generates a combination score for a target user and a selected content item by computing a combination of the content feature vector entry associated with the selected content item and the user feature vector entry associated with the target user using a combining function. The combination score indicates an estimated increase in value for the third party system when the target user is presented with the selected content item. This increase in value is derived from users performing actions desired by the third party system. This might be any action that can be performed by a user on the third party system.

The online system selects one or more content items from a ranked list of content items to transmit to a client device of a target user of the online system for presentation to the target user. The ranked list of content items includes the selected content item and is ranked based on the combination score of each content item in the list.

In one case, the online system inputs the combination score as a feature in a value prediction model. This value prediction model is trained using previously computed combination scores for combinations of previously presented content items and previous users and output labels indicating previously computed values for the previous users. In other words, the ground truth used for this model includes previously computed values for users, and may be received from the third party system. These values may represent a score for the user to the third party system.

The online system determines a value for the selected content item and the target user using the value prediction model and provides the determined value for the selected content item in the ranked list of content items.

In another case, the online system may instead modify a value associated with the selected content item and the target user by the combination score. This modification does not use a machine learning model but instead may be a simple mathematical operation, such as a multiplication. The value for each content item may already exist and be provided by the third party system. The value may represent how likely the user is to perform a desirable action for the third party system. The online system provides the modified value for the selected content item in the ranked list of content items.

The dimensionality of the user feature vector may be the same as the dimensionality of the content feature vector, so that the combining function that is used can be a dot product between the content feature vector and the user feature vector.

In other cases, the combining function used by the online system may be a Euclidian distance between the content feature vector and the user feature vector.

In one embodiment, the online system coordinates with the third party system to iteratively improve on the generated combination score. To do this, the online system transmits the computed combination score and identifiers for the corresponding content item and target user to the third party system to cause the third party system to determine an accuracy for the combination score for the corresponding content and target user. The third party system may have its own computation method for the combination score, and compares its internal score to the score sent from the online system.

The online system subsequently receives updated third party source data from the third party system. This updated third party source data is selected to improve the accuracy of the combination score to within a threshold margin of error according to the third party system. The third party system may determine that any discrepancies between an internal score and the score sent from the online system is due to incomplete data in the third party source data. Thus, the third party system may send the updated third party source data so that the online system can generate a better combination score. The online system modifies the previously received third party source data with the updated third party source data, and generates an updated combination score for the target user and the selected content item.

In some cases, the online system generates a training set of data for a predictive model. This training set of data includes as input data a subset of content feature vector entries, partial user feature vector entries, and data originating from the online system corresponding to the users identified in the subset of partial user feature vector entries. The partial user feature vector entries are selected from a subset of the plurality of user feature vector entries, and is a user feature vector with one or more removed components.

The online system generates output labels for the training set of data, with the output labels including combination scores generated for combinations of content items and users identified in the subset of the content feature vector entries and the subset of the user feature vector entries. These output labels are generated using the full complete user feature vector entries. The online system uses the training data to train the predictive model.

The predictive model is used by the online system to generate combination scores for user feature vectors with incomplete data. The online system inputs into the predictive model the content feature vector associated with the selected content item, a partial content feature vector received from the third party system and associated with an obscured user (a user without a complete set user feature vector), and data from the online system related to the obscured user. The online system in turn receives from the predictive model a predicted combination score for the combination of the selected content item and the obscured user.

Using such a system, the online system is able to generate more accurate scores for content user pairs, i.e., pairs of users and content items, using data received from third party systems. These more accurate scores may be used to better rank content items for selection and presentation to target users of the online system which are more desired by the third party system and/or the target users.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
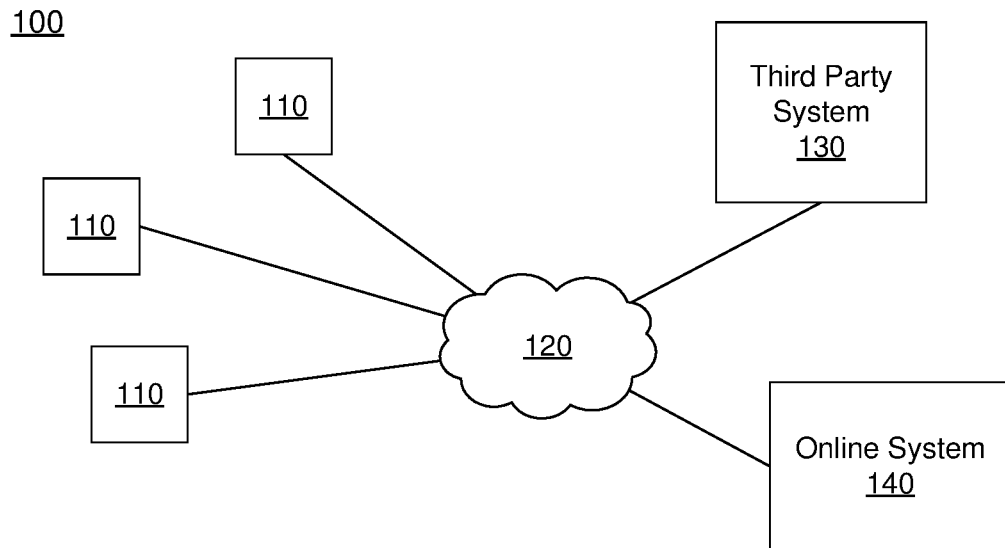
FIG. 1 is a high level block diagram of a system environment for an online system, according to an embodiment.

FIG. 1 is a high level block diagram of a system environment 100 for an online system 140, according to an embodiment. The system environment 100 shown by FIG. 1 comprises one or more client devices 110, a network 120, one or more third-party systems 130, and the online system 140. In alternative configurations, different and/or additional components may be included in the system environment 100. In one embodiment, the online system 140 is a social networking system.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130, such as a sponsored content provider system, may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as content, or information about an application provided by the third party website 130. Specifically, in one embodiment, a third party system 130 communicates sponsored content to the online system 140 for display to users of the client devices 110. The sponsored content may be created by the entity that owns the third party system 130. Such an entity may be a company producing a product, service, message, or something else that the company wishes to promote.

Example Online System

Figure 2:
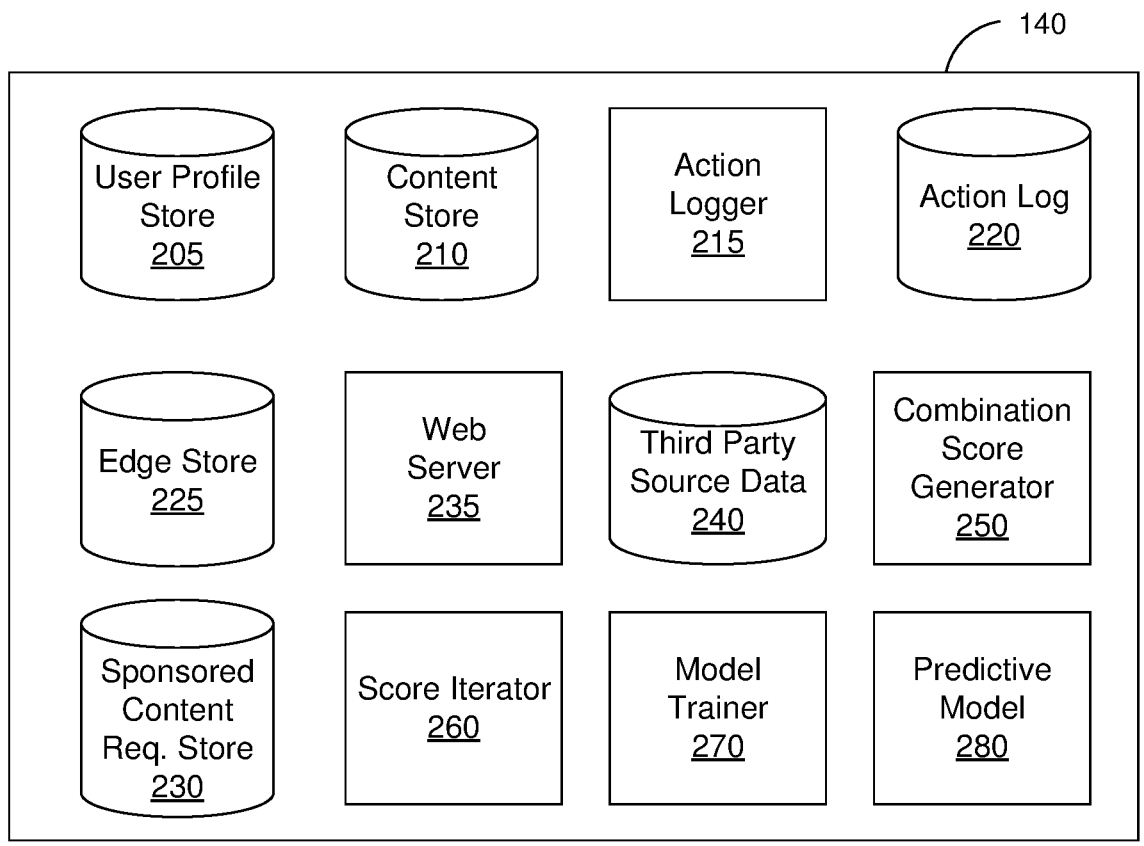
FIG. 2 is an example block diagram of an architecture of the online system, according to an embodiment.

FIG. 2 is an example block diagram of an architecture of the online system 140, according to an embodiment. The online system 140 shown in FIG. 2 includes a user profile store 205, a content store 210, an action logger 215, an action log 220, an edge store 225, a sponsored content request store 230, a web server 235, third party source data 240, a combination score generator 250, a score iterator 260, a model trainer 270, and a predictive model 280. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, groups or applications. In some embodiments, objects are received from third-party applications or third-party applications separate from the online system 140. In one embodiment, objects in the content store 210 represent single pieces of content, or content "items." Hence, users of the online system 140 are encouraged to communicate with each other by posting text and content items of various types of media through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with sponsored content on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website that primarily sells sporting equipment at bargain prices may recognize a user of an online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a third party system 130, including webpage viewing histories, sponsored content that were engaged, purchases made, and other patterns from shopping and buying.

In one embodiment, an edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system. Users or objects within a social networking system can be represented as nodes in a social graph, and the nodes can be connected by edges that represent interactions between two user nodes or interactions between a user node and an object node.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The sponsored content request store 230 stores one or more sponsored content requests. Sponsored content is content that an entity (i.e., a sponsored content provider) presents to users of an online system and allows the sponsored content provider to gain public attention for products, services, opinions, causes, or messages and to persuade online system users to take an action regarding the entity's products, services, opinions, or causes. A sponsored content request includes sponsored content and a value amount (e.g., a "bid value"). The sponsored content is text, image, audio, video, or any other suitable data presented to a user. In various embodiments, the sponsored content also includes a landing page specifying a network address to which a user is directed when the sponsored content is accessed. The value amount is associated with an ad request by a sponsored content provider (who may be the entity providing the sponsored content) and is used to determine an expected value, such as monetary compensation, provided by a sponsored content provider to the online system 140 if sponsored content in the sponsored content request is presented to a user, if the sponsored content in the sponsored content request receives a user interaction when presented, or if any suitable condition is satisfied when sponsored content in the sponsored content request is presented to a user. In some embodiments, the expected value to the online system 140 of presenting the sponsored content may be determined by multiplying the value amount by a probability of the sponsored content being accessed by a user. In one embodiment, a sponsored content is an advertisement.

Additionally, a sponsored content request may include one or more targeting criteria specified by the sponsored content provider. Targeting criteria included in a sponsored content request specify one or more characteristics of users eligible to be presented with sponsored content in the sponsored content request. For example, targeting criteria are used to identify users having user profile information, edges, or actions satisfying at least one of the targeting criteria. Hence, targeting criteria allow an sponsored content provider to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows sponsored content providers to further refine users eligible to be presented with sponsored content from an sponsored content request. As another example, targeting criteria identifies users having a connection to another user or object or having a particular type of connection to another user or object.

The web server 235 links the online system 140 via the network 120 to the one or more client devices 110, as well as to the one or more third party systems 130. The web server 235 serves web pages, as well as other web-related content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 235 may provide application programming interface (API) functionality to send data directly to native client device operating systems, such as IOS®, ANDROID™, WEBOS® or RIM®.

Third Party Source Data

The third party source data 240 includes data regarding sponsored content items and users received from third party systems 130. This information is used by the online system 140 to determine or modify a combination score for a content user pair. The content user pair includes a selected sponsored content item and a target user of the online system 140. The combination score may be used by the online system 140 to estimate the increase in (lifetime) value to the third party system if the selected sponsored content is presented to the target user, according to the third party system 130.

The value for the third party system is increased when an event, action, activity, or other occurrence that is desired by the third party system 130 results directly or indirectly from presenting the sponsored content to the target user. The increase in value may occur due to a conversion, a click by the target user, a view, an installation of an application, an acquisition, or any other activity that benefits the third party system 130 or is desired by the third party system 130. As the target user performs more actions that are desired by or benefit the third party system 130, the value for that user to the third party system 130 increases.

The online system 140 may compute this combination score and use the combination score to modify the generated scores for combinations of sponsored content items and target users, thereby improving the accuracy of the estimates of the increase in value occurring for the third party system 130, compared to estimating the increase in value using data only from the online system 140.

In one case, the data stored in the third party source data 240 comprises content feature vector entries for corresponding sponsored content items of the third party system 130, as well as user feature vector entries for corresponding users of the third party system 130. Both the content feature vectors and the user feature vector entries may be of the same dimensionality (i.e., same length). Each component in a content feature vector entry (e.g., a scalar value in the vector) may be related to a characteristic of a sponsored content item from the third party system 130. Each component is further selected such that it may affect the result of the estimation of the increase in value to the third party system 130. The components of the user feature vector entries are similarly selected and may affect the estimation of the increase in value to the third party system 130. The combination score is computed by the online system 140 for a content user pair using a dot product of the feature vectors, with the selected components, for the corresponding sponsored content item and the corresponding user, as described in further detail below. For example, one component of the content feature vector may indicate a target demographic for the corresponding sponsored content item, while one component of a user feature vector may indicate a demographic that the corresponding user is in. The third party system 130 may select these features based on simple associations (e.g., a bigram model), or based on machine learning principles and other methods.

Although an example of what a component might represent was presented above, the actual information represented by the components within each feature vector may in some cases be unknown to the online system 140 and may only be known to the third party system 130. This ensures that any proprietary or personally identifiable information is not transferred from the third party system 130 to the online system 140. Instead, each feature vector may be associated with an identifier for the corresponding sponsored content item or the corresponding user, and this identifier may be received from the third party system 130 and stored in the third party source data 240. The identifiers allow the online system 140 to match sponsored content items and user profiles that are stored locally with those in the third party source data 240.

For example, for users, the identifier may be a hashed value corresponding to a unique identifier of the user (e.g., email address). The third party system 130 provides this hash to the online system 140, which then attempts to match a user of the online system 140 with the hash value. If a user of the online system 140 also has a hashed identifier matching the hash value provided from the third party system 130, the online system 140 determines that the user of the online system and the user identified by the hash from the third party system 130 are the same user.

Additional details regarding matching users of the online system with identifiers of users provided by third party systems are described in U.S. Pat. Pub. No. 2014/0257999, filed Mar. 7, 2013, U.S. Pat. Pub. No. 2013/0138569, filed Nov. 29, 2011, and U.S. Pat. Pub. No. 2016/0078134, filed Sep. 16, 2014, all of which are incorporated by reference herein in their entirety.

Although the third party source data 240 was describe above primarily in regards to feature vectors, the data stored in the third party source data 240 can be in other formats. In one embodiment, the third party source data 240 stores bigram pairs. Each pair identifies a user and also an associated characteristic of a sponsored content item, indicating a correlation between the user and sponsored content item pair that indicates whether the user will cause a benefit to the third party system if presented with the sponsored content item. The third party source data 240 may be in other formats as well as defined by the third party system 130. The third party system 130 may additionally provide to the online system 140 definitions or other instructions for how to process the data for a content user pair which is in a specified format.

Combination Score Generator

The combination score generator 250 generates the combination scores for each content user pair. As the third party source data 240 may include feature vectors for a very large number of users and sponsored content items, receiving pre-computed scores for each content user pair would not be feasible as there would be a very large number of content user pairs, resulting in a very large amount of data transfer from the third party system 130 to the online system 140. Instead, the online system 140 receives the individual feature vectors for the sponsored content items and the users separately, and the combination score generator 250 computes the combination scores at the online system 140.

In one embodiment, the combination score generator 250 computes the combination score in real time when the online system 140 identifies an impression opportunity for a target user. An impression opportunity is an opportunity for (or event in which) the online system 140 to present a sponsored content item from a third party system 130 to the target user. This may occur when the target user accesses the online system 140 via a client device 110 (e.g., via a website of the online system 140). When the online system 140 identifies the impression opportunity, the online system 140 identifies one or more candidates for the impression opportunity. These candidates may each be (or identify) a sponsored content item (e.g., from the sponsored content request store 230) and may have been selected by the online system 140 for possible presentation to a user based on the respective targeting criteria for each sponsored content item (as described above).

For each candidate sponsored content item, the combination score generator 250 may compute a combined score of the content user pair that is the candidate sponsored content item and the target user associated with the impression opportunity. To compute the score, the combination score generator 250 accesses the third party source data 240 and retrieves the feature vector data for the candidate sponsored content item as well as the user feature vector for the target user. As described above, in some cases the online system 140 may be able to use a hash method match the target user, who is a user of the online system 140, with a user of the third party system 130 associated with a user feature vector in the third party source data 240. If the target user does not have an associated user feature vector, the combination score generator 250 may not generate a combination score, or in one embodiment, a score may be generated for the target user using a predictive model 280 as described below.

After retrieving the appropriate feature vectors, the combination score generator 250 combines the two vectors using a combining function (e.g., any mathematical formula, executable code, or function/function templates) to generate a combination score. In one embodiment, the combining function is a dot product, and so the combination score generator 250 performs a dot product between the content feature vector associated with the sponsored content item and the user feature vector associated with the target user. Using a dot product, the combination score generator 250 generates a scalar value result as the combination score. The combination score may be scaled proportionally with the third party system's determination of the increase in value that presenting the selected sponsored content item to the target user will cause for the third party system 130. Note that this increase in value may be represented by a scalar value as well. Thus, each combination score is specific to a specific content user pair.

The combination score generator 250 may use a different combining function to combine the data in the third party source data 240 corresponding to the content user pair. In one embodiment, the combination score generator 250 uses a Euclidean distance formula on the data received from the third party system 130. The Euclidean distance may be measured for the two feature vectors of the content user pair, with each feature vector representing a point (e.g., a Euclidean vector), and each scalar value in each vector representing a coordinate in the point. The combination score generator 250 calculates the Euclidean distance between the two feature vectors and generates a scalar distance value. This distance value may be directly or inversely proportional to the increase in value computed for the content user pair.

In another embodiment, the combination score generator 250 uses a machine learning method to generate the combination score. For example, the combination score generator 250 may use a perceptron model, a neural network, a Bayesian network, and so on. These models may be trained using a training set of feature vector or other data received from the third party system 130 that includes output labels generated by the third party system 130. The output labels indicate the computed estimation of the increase in value for a certain content user pair.

The combination score generator 250 extracts feature values from the feature vectors in the training set of the training set, the features being variables deemed potentially relevant to the generation of the combination score. In one embodiment, the combination score generator 250 applies dimensionality reduction (e.g., via linear discriminant analysis (LDA), principle component analysis (PCA), or the like) to reduce the amount of data in the feature vectors to a smaller, more representative set of data.

The combination score generator 250 uses supervised machine learning to train the machine learning model, with the feature vectors serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The machine learning model, when applied to the feature vectors, outputs combination score.

In some embodiments, a validation set is formed of additional feature vectors, other than those in the training set, which have combination scores previously determined. The combination score generator 250 applies the machine learning model to the feature vectors of the validation set to quantify the accuracy of the model. Common metrics applied in accuracy measurement include: Precision=TP/(TP+FP) and Recall=TP/(TP+FN), where precision is how many combination scores the machine learning model correctly predicted (TP or true positives) out of the total it predicted (TP+FP or false positives), and recall is how many combination scores the model correctly predicted (TP) out of the total number of feature vectors in the validation set. The F score (F-score=2*PR/(P+R)) unifies precision and recall into a single measure. In one embodiment, the combination score generator 250 iteratively re-trains the machine learning model until the occurrence of a stopping condition, such as the accuracy measurement indication that the model is sufficiently accurate, or a number of training rounds having taken place.

As described above, in one embodiment, the data stored in the third party source data 240 are pairs provided by the third party system 130. The combination score generator 250 may search the third party source data 240 to see if a bigram pair exists for the content user pair corresponding to the target user and the selected sponsored content item. If the combination score generator 250 finds a bigram pair, then it may indicate a combination score indicating a positive value (e.g., "1"), else it may indicate a score of zero, or a negative score, based on the bigram pair. For example, if the bigram pair indicates a high correlation between a user and a content item, the combination score generator 250 may generate a default positive value combination score (e.g., 1).

In one embodiment, the third party system 130 provides a different format of data than that described above, and may also provide a definition of a custom function or a function template that processes the data of a content user pair. For example, the definition may define a function having as inputs the selected data for the selected sponsored content item and the target user, and may compute as an output the combination score. In this case, the combination score generator 250 uses the format and function definition provided by the third party system 130 instead to generate a combination score for the content user pair.

Once the combination score is generated for a content user pair, the combination score generator 250 uses it to modify or generate the bid value for the selected sponsored content item based on the combination score. The bid value may be used in a content auction (i.e., a ranking of different sponsored content based on their respective bid values) to determine whether the selected sponsored content item should be presented to the target user.

The combination score generator 250 may directly use the combination score as a multiplier for the existing bid value for the sponsored content item. The existing bid value may be selected by the third party system 130 or generated by the online system 140 based on various targeting criteria, user models, and other computations. For example, the online system may have computed the existing bid value based on an eCPM (effective cost per mile) bid value.

In another embodiment, the combination score generator 250 submits the combination score as a feature in a bid prediction model for determining the final bid value for the selected sponsored content item. The bid prediction model may be trained using a training set that includes previously computed combination scores for content user pairs, other feature data for the user and sponsored content item for the content user pairs (e.g., feature data that is already in used in an existing bid prediction model), along with output labels indicating the bid values generated for the previous users. The bid prediction model, using the new combination score as a feature, may be able to make a better prediction of whether the user will increase the value for the third party system 130 if presented with the selected sponsored content from the third party system 130, and may generate a bid value that accurately represents this better prediction.

Additional details regarding determining bid amounts are further described, for example, in U.S. patent application Ser. No. 14/160,510, filed Jan. 21, 2014, which is hereby incorporated by reference in its entirety.

Once the bid value is determined for each content user pair, the content user pair with the highest (e.g., winning) bid is selected by the online system 140, and the selected sponsored content item from the winning content user pair is presented by the online system 140 to the target user of the content user pair. The selection of the winning content user pair and generation of the bid value may be performed completely in real-time, with the delay to the user between the identification of the impression opportunity and the presentation of the sponsored content to be very small (e.g., under 100 milliseconds). As the generation of the bid value may be performed in real-time, the online system 140 receives the third party source data 240 from the third party system 130 beforehand as the amount of data is large and may not be reliably transferred to achieve real-time processing.

Additional details regarding the generation of the combination score are described below with reference to FIG. 3.

Score Iterator

In one embodiment, the online system 140 includes a score iterator 260 to provide the third party system 130 with feedback in order to refine the third party source data 240 to achieve a better prediction of the estimation of the increase in value for a content user pair. In some cases, the third party source data 240 provided by the third party system 130 may not be able to assist the online system 140 in predicting an accurate estimation of the increase in value of a target user to the third party system 130 after being presented with the sponsored content item. In other words, using the existing third party source data 240, the combination score generated by the combination score generator 250 may be inaccurate. To improve the accuracy of the combination score this, the score iterator 260 sends the combination score and/or the bid value generated for content user pairs for the third party system 130 to the third party system 130 (even if the content user pair did not generate a winning bid), along with the associated identifiers of the sponsored content item and the user in the content user pair that was provided to the online system 140 by the third party system 140. The third party system 130 may determine the difference between its own predictions and the data sent to the third party system 130 by the score iterator 260, and based on various tests (e.g., fitting models, etc.), the third party system 130 determine that additional data elements, such as additional components for the feature vectors, or updated versions of existing data elements, should be sent to the online system 140 to improve the prediction and bid value generated by the online system 140 (in accordance with the specifications of the third party system).

The score iterator 260 may thus receive this updated data from the third party system 130 and update the information in the third party source data 240 with the updated data, although the score iterator 260 may keep a backup in case the updated data generates a less optimal prediction. New combination scores are generated by the combination score generator 250, and the score iterator 260 may again submit the scores or bid values to the third party system 130 for review, after which the score iterator 260 may again receive additional or updated data. This may iterate until the combination score and/or bid value generated by the online system 140 is within a threshold margin of error that is acceptable to the third party system 130 (e.g., a threshold percentage specified by the third party system 130).

Predictive Model and Trainer

The predictive model 280 predicts a combination score for a content user pair when the data for the user of the content user pair is incomplete or unavailable. The third party system 130 may request such predictions be made by the online system 140 in order to generate more accurate predictions of the increase in value for users for whom the third party system 130 has incomplete data or for which the third party system 130 has no data. In many cases, the online system 140 may have many users for whom the third party system 130 has not encountered or logged before. However, these obscured users (i.e., users of the online system for whom the third party system has incomplete or no data) may nevertheless be good targets for presenting the sponsored content items from the third party system 130. However, as the third party system has no data for these obscured users, the combination score generator 250 may not be able to generate a combination score for these obscured users based on the data from the third party system 130. This means the bid value cannot be influenced by the combination score, and this may result in missed opportunities for the third party system 130 to present sponsored content to users that may cause an increase in value to the third party system 130.

Thus, the predictive model 280 is used to generate the combination scores for these obscured users in order to widen the number of predictions made for content user pairs to the undiscovered users that the third party system 130 has not encountered before, or for which the third party system 130 has incomplete data. This may allow the third party system 130 to increase its reach to additional users in an effective manner, as although the third party system 130 has partial or no information regarding these obscured users, the predictive model 280 is able to determine whether these obscured users are valuable to the third party system 130 by modeling the method in which the third party system 130 determines the value of a user to the third party system 130.

The method used by the third party system 130 is the method described above whereby the third party system 130 provides the third party source data 240 to the online system 140, which is used to generate the combination score. It is assumed that the information provided by the third party system 130 is able to be used to accurately measure the increase in value of the user to the third party system 130, and thus by modeling this provided information, the predictive model 280 is able to also accurately predict a combination score of a content user pair for a third party system 130 in accordance with the requirements of the third party system 130.

The model trainer 270 trains the predictive model 280 to generate combination scores for content user pairs where the data for the user is incomplete or unavailable (i.e., for the obscured users). The model trainer 270 may use as training data for the predictive model 280 the existing third party source data 240 along with additional user profile data, or may instead (or additionally) use training data provided by the third party system 130 for the purpose of training the predictive model 280.

In one embodiment, the model trainer 270 uses the existing third party source data 240 to train the predictive model 280. The model trainer 270 takes the data related to users from the third party source data 240 and purposely removes component data elements from the user data. In one case where the user related data are feature vectors, the model trainer 270 purposely removes some or all of the components (e.g., the scalar components) of the user feature vector data and uses the remainder of the user feature vector data and the content feature vector data as the input training set.

Whether the model trainer 270 removes some or all of the components of the user feature vector from the training data may be determined by what data the third party system 130 has for the obscured users. The model trainer 270 may remove from the training set components of the user feature vectors for which the third party system does not have for the obscured users. For example, if the third party system 130 only knows a single component in the user feature vector for obscured users (e.g., age), the online system 130 may remove all components except for this single component in the user feature vectors that are used for the training data.

In addition, as the model trainer 270 has removed most of the user feature data, the model trainer 270 adds as additional training data the data stored by the online system 140 corresponding to the users identified in the user feature vectors. This online system source data may include features extracted from related user data from the user profile store 205, data from the action log 220 corresponding to the users identified in the user feature data, data from the edge store 225 corresponding to the users identified in the user feature data, and so on. The online system source data may include feature vector data for users produced by the online system instead. For example, the online system 140 may store various characteristics for each user, as described above, such as connections made within the online system 140, comments posted, and so on, and extract these as features for the training data.

Using this information, the model trainer 270 is able to generate training data for the model comprising new input data and output labels. The new input data for each content user pair comprising the content feature vectors for each sponsored content item, the partial user feature vector data for each user (if any), and the feature data originating from the online system corresponding to each user. The content user pairs used for the input data may be a randomly selected subset of the users and sponsored content items identified in the third party source data 240. The output labels used by the model trainer 270 may include the combination scores created by the combination score generator 250 using the content feature vectors and the full user content feature vector data for the corresponding users (where the components of the user content feature vectors were not removed). Thus, for a sponsored content item A and a user B, the training data for the predictive model 280 comprises the content feature vector for the sponsored content item A, some of the components of the user feature vector for user B, the online system source data for the user B, and the combination score computed using the full feature vectors for the sponsored content item A and the user B.

The model trainer 270 may alternatively use training data specifically provided by the third party system 130 for the purposes of training the predictive model 280. This training data may be in a similar format to the training data generated from the third party source data 240 as described above, i.e., the user data in the training data is partially or fully removed and additional online system source data for the user is used as input features.

After training the predictive model 280, the model trainer 270 may verify the accuracy of the predictions generated by the predictive model 280 using a validation data set. This data set may comprise data from the third party source data 240 which was not used as the training data, or may include new data received from the third party system 130 for the purposes of validating the predictive model 280.

If the predictions made by the predictive model 280 are not accurate according to the testing using the validation data set (e.g., the error or difference exceeds a certain threshold), the model trainer 270 may modify the training data set to include additional features or remove additional features. The model trainer 270 may test the addition and removal of each feature by training the predictive model 280 with the modified features and determining whether the output from the predictive model 280 is accurate (e.g., within an accuracy measure). Once a satisfactory accuracy is reached, the model trainer 270 indicates that the predictive model 280 is fully trained.

Note that the predictive model 280 may be trained separately for each third party system 130, as each third party system 130 may have a different set of important features. In some cases, the predictive model 280 may be trained separately for each sponsored content item, if a single model is unable to predict a good combination score for a combined set of sponsored content items from a single third party system 130.

Additional details regarding training the model are described below with reference to FIG. 4.

Exemplary Advantages

Using the system described above, an online system 140 is able to better estimate the increase in value by a user to a third party system 130, as the online system 140 is able to leverage its own data about users as well as the third party system's data about the same users and their predicted reactions to sponsored content items from the third party system 130. The ability for the third party system 130 to provide additional data, such as a custom function for the combination score generator 250, may allow the third party system 130 to ensure privacy or obfuscation of the data provided to the online system. The data in the third party source data could be arbitrary values of which the online system 140 has no understanding, but by using a particular combining function, the online system 140 may still produce a meaningful combination score. The third party source data may also include deeper relationships and modeling based on additional information collected by the third party system that is unavailable to the online system. This can be used to enhance or "speed up" the more accurate computation of scores for the online system 140.

Furthermore, using the data from the third party system 130, the online system 140 is able to further target additional users of the online system 140 for which the third party system 130 may not have encountered before or for which the third party system does not have a full set of data (i.e., the obscured users), and make predictions for these users using the third party system's data. This allows the third party system 130 to increase its audience to additional users, but by using the data provided by the third party system 130 augmented by the data from the online system 140, this increase of audience is not done using an approach that might cast a wide net but yield few results. Instead, the discovery of additional users is done efficiently in order to find the users that are more likely to have an increased value to the third party system when presented with content from the third party system.

Additionally, as the third party source data and any combining functions are provided a priori, the online system 140 does not need to request this data from the third party system 130 at operation time when content is selected for presentation to users.

Figure 3:
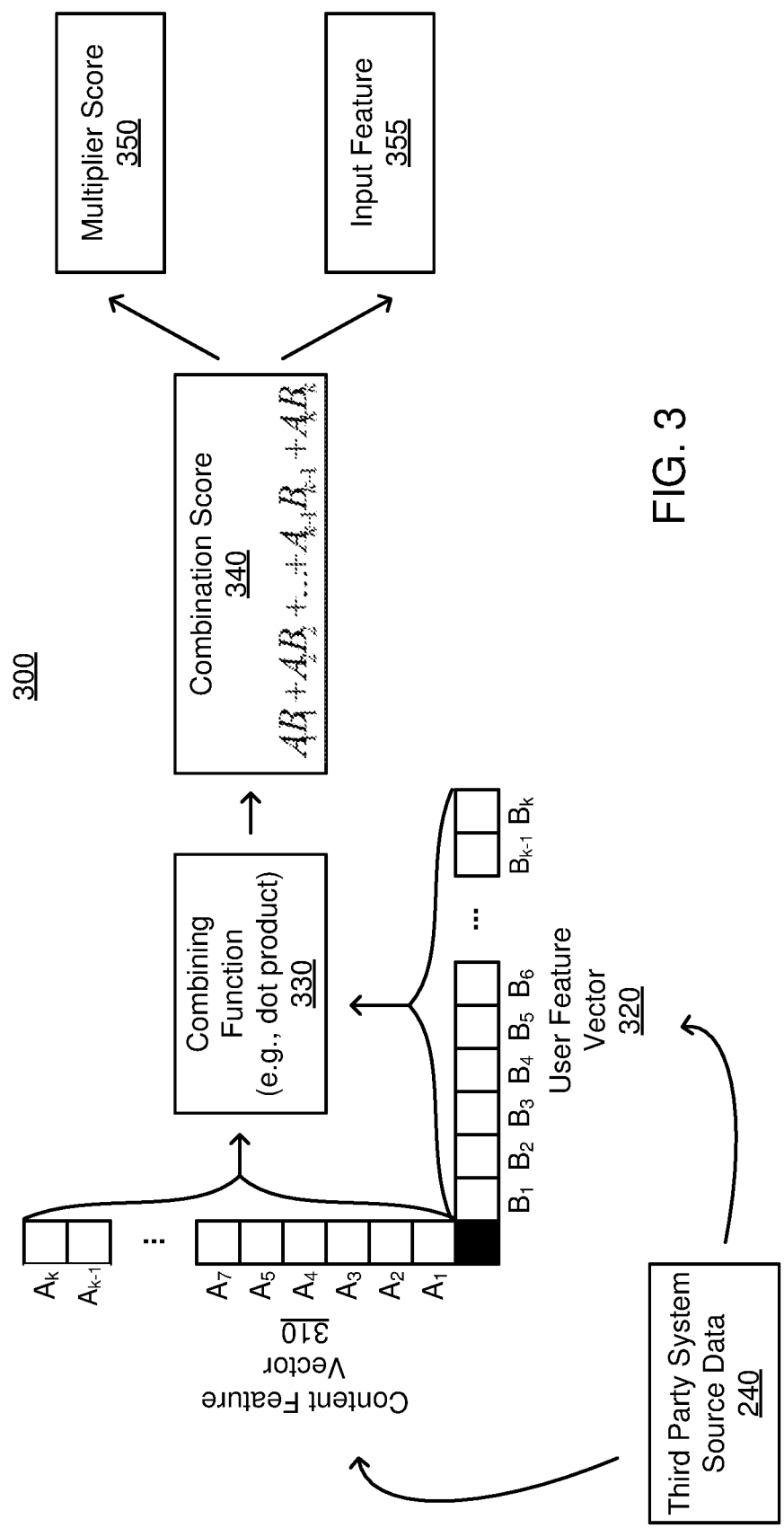
FIG. 3 is a diagram illustrating a process for combining the feature vector data from the third party source data to generate a combination score for a content user pair, according to an embodiment.

Exemplary Diagram Illustrating the Combination of Feature Vectors from the Third Party System to Generate Combination Score FIG. 3 is a diagram illustrating a process 300 for combining the feature vector data from the third party source data 240 to generate a combination score for a content user pair, according to an embodiment. This combination score may then be used to influence the bid value for the sponsored content item to determine whether the sponsored content item in the content user pair should be presented to the target user in the content user pair.

As illustrated in FIG. 3, the content feature vector 310 is a feature vector for a selected sponsored content item. The user feature vector 320 is a feature vector for a selected user, i.e., the target user. Each vector has multiple components, represented here as $A_1$-$A_k$ for the sponsored content item and $B_1$-$B_k$ for the target user. As noted previously, these components may be any value and may represent any type of characteristics or be derived from characteristics of the underlying sponsored content item or user. For example, the user feature vector 320 may include components such as user demographics, logged user actions, user connections, user location, and so on. The content feature vector 310 may include components such as content type, content size, content value, content age, and so on. The exact content of each feature vector may be determined by the third party system 130 and the characteristic or other elements (i.e., the semantics) that each component of the feature vectors are describing may be unknown to the online system 140.

In one case, the combining function 330 needs the two feature vectors of the content and the user to be of the same length, and thus, in FIG. 3 both the content feature vector 310 and the user feature vector 320 are represented with the same dimension of k. After an impression opportunity is identified for a target user, the online system 140 (e.g., the combination score generator 250) may apply the combining function 330 to the content feature vector 310 of the selected sponsored content under consideration, and the user feature vector 320 of the target user. In the illustration of FIG. 3, the combining function 330 is a dot product, although as described above it may be a different function.

After applying the combining function 330 to the data, the online system 140 generates the combination score 340. As shown in FIG. 4, the combination score is a dot product, and so it is equal to: $A_1B_1+A_2B_2+ \ldots +A_{k-1}B_{k-1}+A_kB_k$. This combination score 340 is a scalar value, and may be used as a multiplier score 350 to modify the bid value of the selected sponsored content item in a content auction, or may be used as an input feature 355 to determine the bid value. The combination score 340 may also be used for other purposes, such as to improve the predictive ability of the third party system's models, etc.

The online system 140 may repeat the process described in FIG. 3 for multiple content user pairs. In particular, for each sponsored content item that is selected by the online system 140 to be a candidate for possible presentation to a target user in an impression opportunity, the online system 140 may determine a combination score (and a modified bid value) for that sponsored content item and target user pair. It may be the case that the combination score 340 for a content user pair is very low, and is below a threshold value. In such a case, the online system 140 may refrain from computing a modified bid value, and remove the sponsored content item in the content user pair from consideration.

Figure 4:
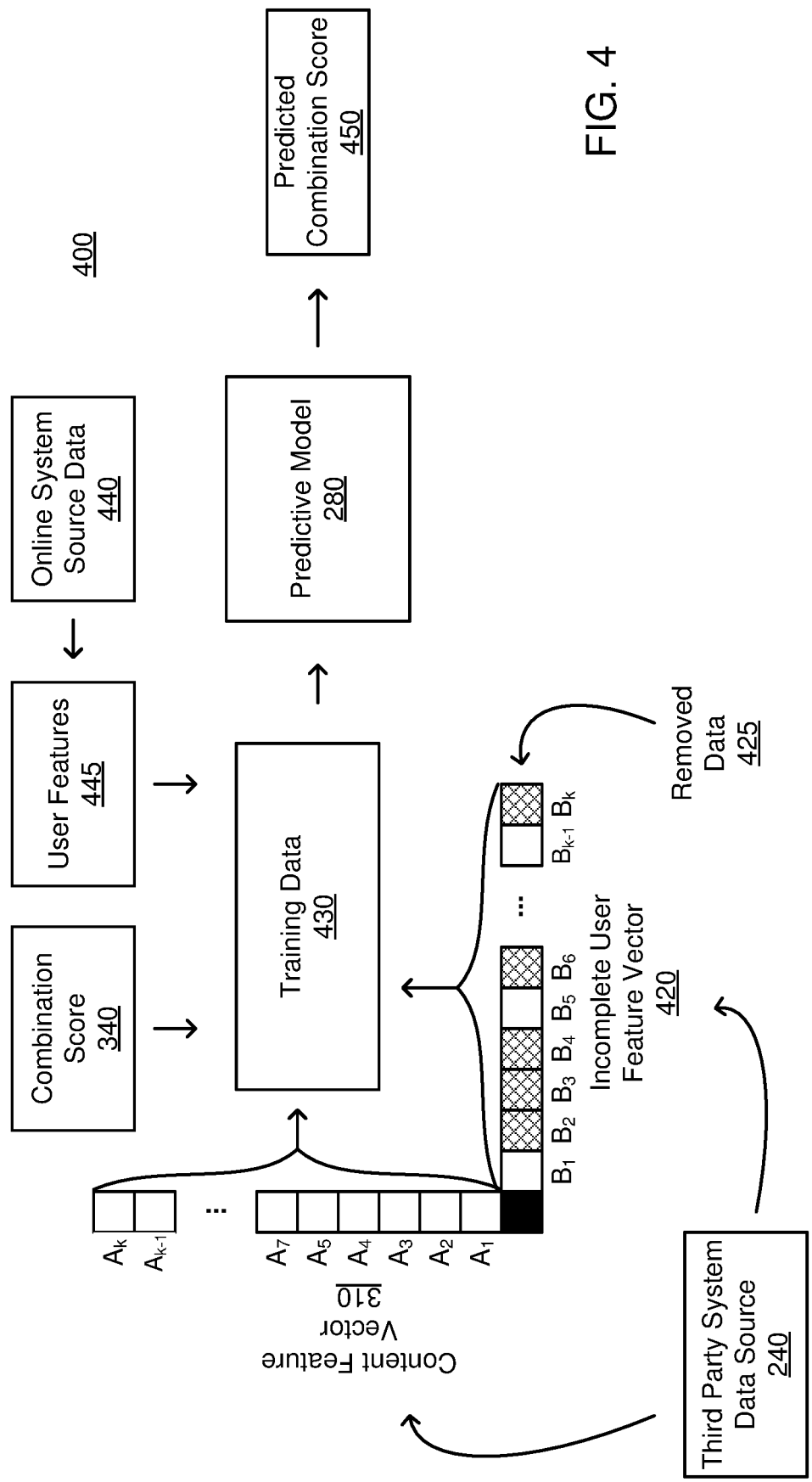
FIG. 4 is a diagram illustrating a process for using the feature vector data from the third party source data to train a predictive model for generating predicted scores, according to an embodiment.

Exemplary Diagram Illustrating the Training of a Predictive Model Using Incomplete Third Party Feature Data FIG. 4 is a diagram illustrating a process 400 for using the feature vector data from the third party source data 240 to train a predictive model for generating predicted scores, according to an embodiment. The predictive model may be used to generate combination scores for users of the online system 140 for which the third party system 130 doesn't have feature vector data.

As described previously in FIG. 3, the online system 140 uses the feature vector data from the third party source data 240. However, unlike in FIG. 3, while the content feature vector 310 is complete, the user feature vector is not complete, and instead an incomplete user feature vector 420 is used. The incomplete user feature vector 420 may be generated by the online system 140 (e.g., by the model trainer 270) by removing features from the complete user feature vector, as described above. In FIG. 4, the components of the vector where the data are removed are indicated by cross hatches, such as in removed data 425.

The content feature vector 310 and the incomplete user feature vector 420 are paired with the previously computed combination score 340 (which is the output label) to create the training data 430 for the predictive model 280. The combination score 340 was previously generated from the content feature vector 310 and the complete version of the user feature vector 420 without the removed data 425. In addition, the online system also extracts user features 445 from the online system source data 440 that are related to the user identified in the user feature vector for use as training data 430.

Although not every component of the incomplete user feature vector 420 has been removed in the example in FIG. 4, in some cases all the data of the user feature vector is removed, i.e., no user feature data is provided for the training data 430. Instead, the online system 140 relies only on the user features 445 from the online system source data 440 for the user.

Using the training data 430, the online system trains the predictive model 280, according to the methods described above. After being trained, the predictive model 280 is able to generate the predicted combination score 450 when provided input comprising the content feature vector for a sponsored content item from the third party source data, user features for a user extracted from online system source data, and incomplete user feature vector data from the third party source data.

Figure 5:
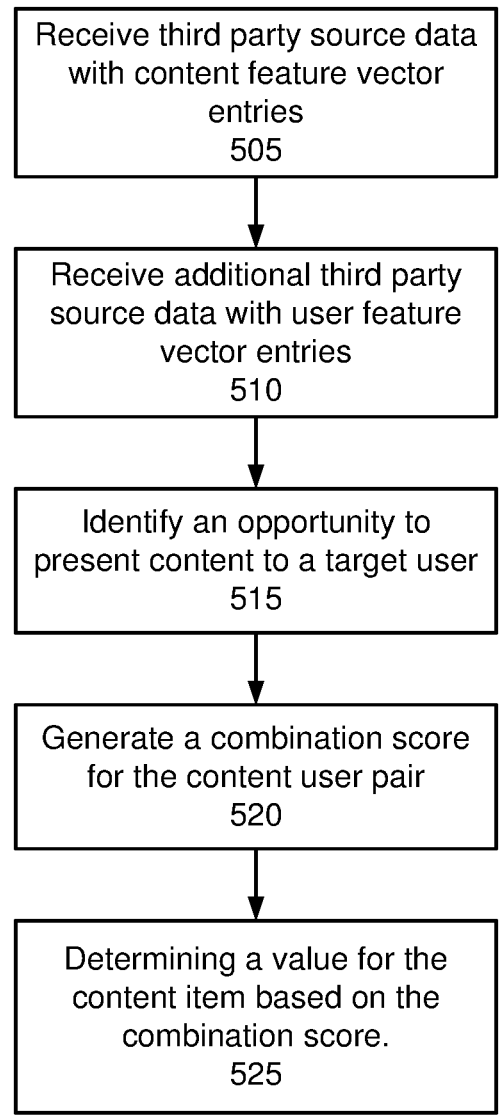
FIG. 5 is a flowchart of one embodiment of a method in an online system for determining combination scores for content user pairs, according to an embodiment.

Exemplary Flow of a Method for Determining Combination Scores for Content User Pairs FIG. 5 is a flowchart of one embodiment of a method in an online system for determining combination scores for content user pairs, according to an embodiment. In other embodiments, the method may include different and/or additional steps than those described in conjunction with FIG. 5. Additionally, in some embodiments, the method may perform the steps described in conjunction with FIG. 5 in different orders. In one embodiment, the method is performed by one or more of the modules of the online system 140 described above.

The online system 140 receives 505 third party source data with content feature vector entries. As noted, each vector includes components describing characteristics of content items that have been received from the third party system 130.

The online system 140 also receives 510 additional third party source data including user feature vector entries. The user feature vectors include components describing characteristics of users for which the third party system 130 has encountered.

The online system 140 identifies 515 an opportunity to present content to a target user of the online system. This content may include sponsored content received from the third party system 130.

The online system 140 generates 520 a combination score for the content user pair. The combination score may be generated by the online system 140 as described above using the content feature vector for content items received from the third party system 130 and the user feature vector for the target user. The online system 140 may generate multiple combination scores for content user pairs that include the target user and various content items from different third party systems 130.

The online system 140 determines 525 a value for the content item based on the combination score. This value is used to rank the content item with other content items, each having their own computed values that have been determined based on their respective combination scores. The content item that is ranked with the highest value may then be presented to the target user.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, at an online system, third party source data from a third party system, the third party source data comprising information for a plurality of content items and information for a plurality of users;
   generating, at the online system, one or more content feature entries, each content feature entry describing a content item from the third party system;
   generating, at the online system, one or more user feature entries, each user feature entry describing a user;
   determining an opportunity to provide content to a target user of the plurality of users;
   for each of a set of candidate content items of the plurality of content items, the online system applying a trained value prediction model to generate a value based on:
      the one or more content feature entries for the candidate content item,
      the one or more user feature entries for the target user, and
      one or more additional features maintained by the online system; and
   selecting, at the online system, one or more of the candidate content items to transmit to a client device of the target user for presentation to the target user based on the value for each of the one or more candidate content items and the target user.

2. The method of claim 1, wherein the one or more content feature entries are related to characteristics of the corresponding content item; and wherein the one or more user feature entries are related to characteristics of the corresponding user.

3. The method of claim 1, wherein the set of candidate content items are one or more highest ranked content items selected from a ranked list of content items, the ranked list of content items ranked based on the value.

4. The method of claim 1, wherein applying the trained model for each of the set of candidate content items of the plurality of content items comprises:
combining the one or more content feature entries for the candidate content item with the one or more user feature entries for the target user to generate a combination score;
inputting the combination score as a feature in the value prediction model, the value prediction model trained using previously computed combination scores for combinations of previously presented content items and previous users and output labels indicating previously computed values for the previous users.

5. The method of claim 1, further comprising:
combining the one or more content feature entries for the candidate content item with the one or more user feature entries for the target user to generate a combination score;
transmitting the combination score and identifiers for the corresponding content item and target user to the third party system to cause the third party system to determine an accuracy for the combination score for the corresponding content and target user;
receiving updated third party source data from the third party system, the updated third party source data selected to improve the accuracy of the combination score to within a threshold margin of error according to the third party system; and
modifying the previously received third party source data with the updated third party source data.

6. The method of claim 1, further comprising:
generating a training set of data for the predictive model, the training set of data including as input data a subset of the one or more content feature entries, user feature entries, and data originating from the online system corresponding to the users identified in the subset of user feature entries, the user feature entries selected from a subset of the one or more user feature vector entries;
generating output labels for the training set of data, the output labels including combination scores generated for combinations of content items and users identified in the subset of the one or more content feature entries and the subset of the one or more user feature vector entries; and
training the predictive model using the training data.

7. The method of claim 6, further comprising:
inputting into the predictive model the content feature entry associated with the selected content item, a content feature entry received from the third party system and associated with an obscured user, and data from the online system related to the obscured user, the obscured user being a user of the online system for which the third party system has incomplete data; and
receiving from the predictive model a predicted combination score for the combination of the selected content item and the obscured user.

8. The method of claim 5, further comprising:
inputting into the predictive model the content feature entry associated with the selected content item and data from the online system related to the obscured user, the obscured user being a user of the online system for which the third party system has no data; and
receiving from the predictive model a predicted combination score for the combination of the selected content item and the obscured user.

9. A computer program product comprising a non-transitory computer readable storage medium having instructions encoded thereon that, when executed by a processor, cause the processor to:
receive, at an online system, third party source data from a third party system, the third party source data comprising information for a plurality of content items and information for a plurality of users;
generate, at the online system, one or more content feature entries, each content feature entry describing a content item from the third party system;
generate, at the online system, one or more user feature entries, each user feature entry describing a user;
determine an opportunity to provide content to a target user of the plurality of users;
for each of a set of candidate content items of the plurality of content items, apply a trained value prediction model to generate a value based on:
the one or more content feature entries for the candidate content item,
the one or more user feature entries for the target user, and
one or more additional features maintained by the online system; and
select, at the online system, one or more of the candidate content items to transmit to a client device of the target user for presentation to the target user based on the value for each of the one or more candidate content items and the target user.

10. The computer program product of claim 1, wherein the set of candidate content items are one or more highest ranked content items selected from a ranked list of content items, the ranked list of content items ranked based on the value.

11. The computer program product of claim 9, wherein applying the trained model for each of the set of candidate content items of the plurality of content items comprises:
combine the one or more content feature entries for the candidate content item with the one or more user feature entries for the target user to generate a combination score;
input the combination score as a feature in the value prediction model, the value prediction model trained using previously computed combination scores for combinations of previously presented content items and previous users and output labels indicating previously computed values for the previous users.

12. The computer program product of claim 9, wherein the non-transitory computer readable storage medium comprising further instructions encoded thereon that, when executed by a processor, cause the processor to:
combine the one or more content feature entries for the candidate content item with the one or more user feature entries for the target user to generate a combination score;
transmit the combination score and identifiers for the corresponding content item and target user to the third party system to cause the third party system to determine an accuracy for the combination score for the corresponding content and target user;

receive updated third party source data from the third party system, the updated third party source data selected to improve the accuracy of the combination score to within a threshold margin of error according to the third party system; and modify the previously received third party source data with the updated third party source data.

13. The computer program product of claim 9, wherein the non-transitory computer readable storage medium comprising further instructions encoded thereon that, when executed by a processor, cause the processor to:

generate a training set of data for the predictive model, the training set of data including as input data a subset of the one or more content feature entries, user feature entries, and data originating from the online system corresponding to the users identified in the subset of user feature entries, the user feature entries selected from a subset of the one or more user feature vector entries;

generate output labels for the training set of data, the output labels including combination scores generated for combinations of content items and users identified in the subset of the one or more content feature entries and the subset of the one or more user feature vector entries; and train the predictive model using the training data.

14. The computer program product of claim 13, wherein the non-transitory computer readable storage medium comprising further instructions encoded thereon that, when executed by a processor, cause the processor to:

input into the predictive model the content feature entry associated with the selected content item, a content feature entry received from the third party system and associated with an obscured user, and data from the online system related to the obscured user, the obscured user being a user of the online system for which the third party system has incomplete data; and receive from the predictive model a predicted combination score for the combination of the selected content item and the obscured user.

15. The computer program product of claim 12, wherein the non-transitory computer readable storage medium comprising further instructions encoded thereon that, when executed by a processor, cause the processor to:

input into the predictive model the content feature entry associated with the selected content item and data from the online system related to the obscured user, the obscured user being a user of the online system for which the third party system has no data; and receive from the predictive model a predicted combination score for the combination of the selected content item and the obscured user.

\* \* \* \* \*